US008569440B2

(12) United States Patent
Spyrou et al.

(10) Patent No.: US 8,569,440 B2
(45) Date of Patent: Oct. 29, 2013

(54) HIGHLY REACTIVE POLYURETHANE COMPOSITIONS CONTAINING URETDIONE GROUPS

(75) Inventors: Emmanouil Spyrou, Schermbeck (DE); Rainer Lomölder, Münster (DE); Dirk Hoppe, Nottuln (DE); Christoph Nacke, Schermbeck (DE); Andre Raukamp, Rosendahl-Holtwick (DE)

(73) Assignee: Evonik Degussa GmbH, Essen (DE)

( * ) Notice: Subject to any disclaimer, the term of this patent is extended or adjusted under 35 U.S.C. 154(b) by 397 days.

(21) Appl. No.: 11/576,851

(22) PCT Filed: Sep. 8, 2005

(86) PCT No.: PCT/EP2005/054443
§ 371 (c)(1),
(2), (4) Date: Jan. 3, 2008

(87) PCT Pub. No.: WO2006/040225
PCT Pub. Date: Apr. 20, 2006

(65) Prior Publication Data
US 2008/0097025 A1    Apr. 24, 2008

(30) Foreign Application Priority Data
Oct. 7, 2004  (DE) .......................... 10 2004 048 775

(51) Int. Cl.
*C08G 18/00* (2006.01)

(52) U.S. Cl.
USPC ............... 528/52; 528/48; 528/51; 528/59; 528/60; 528/76; 528/80; 528/85; 548/335.1; 548/951; 548/952; 252/182.21; 252/182.22

(58) Field of Classification Search
USPC ........ 524/590; 525/123, 457; 548/335.1, 951, 548/952; 528/59, 60, 80, 76, 85, 48, 51, 52; 252/182.21, 182.22
See application file for complete search history.

(56) References Cited

U.S. PATENT DOCUMENTS

| | | | |
|---|---|---|---|
| 3,923,743 A | | 12/1975 | Quiring et al. |
| 4,044,171 A | * | 8/1977 | Muller et al. ................. 427/485 |
| 4,119,565 A | * | 10/1978 | Baatz et al. ............. 428/402.21 |
| 4,443,590 A | * | 4/1984 | Kamatani et al. ................ 528/51 |
| 4,894,429 A | * | 1/1990 | Grogler et al. .................. 528/45 |
| 5,354,834 A | * | 10/1994 | Yoshida et al. .................. 528/59 |
| 5,356,945 A | * | 10/1994 | Werner et al. .................. 521/159 |
| 5,786,419 A | * | 7/1998 | Meier-Westhues et al. .. 524/590 |
| 5,854,360 A | * | 12/1998 | Matsunaga et al. ........... 525/452 |
| 5,989,715 A | * | 11/1999 | Kiriazis et al. .............. 428/425.1 |
| 6,207,289 B1 | | 3/2001 | Hoffmann et al. |
| 6,417,313 B2 | * | 7/2002 | Spyrou ........................... 528/59 |
| 6,914,115 B2 | | 7/2005 | Spyrou et al. |
| 7,019,088 B1 | * | 3/2006 | Lehmann et al. ............. 525/460 |
| 7,066,837 B2 | * | 6/2006 | Jordan ........................... 473/374 |
| 2003/0153713 A1 | * | 8/2003 | Spyrou et al. ................... 528/48 |
| 2004/0110918 A1 | * | 6/2004 | Laas et al. ....................... 528/73 |
| 2004/0219367 A1 | | 11/2004 | Spyrou et al. |
| 2005/0003206 A1 | | 1/2005 | Spyrou et al. |
| 2005/0090627 A1 | | 4/2005 | Wenning et al. |
| 2005/0090636 A1 | | 4/2005 | Wenning et al. |
| 2005/0096450 A1 | | 5/2005 | Spyrou et al. |
| 2005/0096451 A1 | | 5/2005 | Spyrou |
| 2005/0119437 A1 | | 6/2005 | Wenning et al. |
| 2005/0239956 A1 | * | 10/2005 | Spyrou et al. ................. 524/589 |
| 2005/0239992 A1 | | 10/2005 | Spyrou et al. |
| 2008/0274394 A1 | | 11/2008 | Schormann et al. |
| 2010/0168329 A1 | | 7/2010 | Hoppe et al. |
| 2010/0222540 A1 | | 9/2010 | Raukamp et al. |
| 2012/0313031 A1 | | 12/2012 | Hoppe et al. |

FOREIGN PATENT DOCUMENTS

| | | | |
|---|---|---|---|
| CA | 2465977 | * | 4/2004 |
| DE | 198 56 878 | | 6/2000 |
| EP | 1 334 987 | | 8/2003 |
| EP | 1 526 146 | | 4/2005 |

OTHER PUBLICATIONS

U.S. Appl. No. 11/909,098, filed Sep. 19, 2007, Spyrou, et al.
U.S. Appl. No. 11/909,549, filed Sep. 24, 2007, Weiss, et al.
U.S. Appl. No. 12/809,911, filed Jun. 21, 2010, Spyrou, et al.
U.S. Appl. No. 12/990,138, filed Oct. 28, 2010, Spyrou.
U.S. Appl. No. 12/740,818, filed Apr. 30, 2010, Spyrou.
U.S. Appl. No. 13/642,762, filed Oct. 22, 2012, Albrecht, et al.
U.S. Appl. No. 13/810,670, filed Jan. 17, 2013, Hoerpel, et al.

\* cited by examiner

*Primary Examiner* — Michael L Leonard
(74) *Attorney, Agent, or Firm* — Oblon, Spivak, McClelland, Maier & Neustadt, L.L.P.

(57) ABSTRACT

The invention relates to high-reactivity polyurethane compositions containing uretdione groups and intended for use in the plastics sector.

18 Claims, No Drawings

HIGHLY REACTIVE POLYURETHANE COMPOSITIONS CONTAINING URETDIONE GROUPS

The invention relates to high-reactivity polyurethane compositions containing uretdione groups and intended for use in the plastics sector.

Polyurethane compositions containing uretdione groups are known.

DE 10 14 70 describes reaction products of aromatic diisocyanates, containing uretdione groups, and difunctional hydroxyl compounds. The use of diisocyanates is not mentioned.

DE 95 29 40, DE 96 85 66 and DE 11 53 900 describe reaction products of diisocyanates, diisocyanates containing uretdione groups, and difunctional hydroxyl compounds. Mention is only made of aromatic isocyanate derivatives, however, which are known to lack weathering stability and to tend toward yellowing.

DE 20 44 838 describes the continuation reaction of polyurethane compositions, containing uretdione groups, with polyamines. Here again only aromatic diisocyanates are mentioned.

DE 22 21 170 describes the reaction of NCO-terminated polyurethane compositions, containing uretdione groups, with diamines, with retention of the uretdione groups. The resultant urea structures are frequently undesirable on account of their incompatibility and brittleness.

DE 24 20 475 includes the description of a process for preparing powder coating crosslinkers which are composed of diisocyanates containing uretdione groups, of diisocyanates, and of difunctional hydroxyl compounds, the latter being restricted to the molecular range from 62 to 300 g/mol.

U.S. Pat. No. 4,496,684 mentions reaction products of diisocyanates containing uretdione groups and difunctional hydroxyl compounds, which are intended for subsequent crosslinking with acid anhydrides. The use of diisocyanates is not described.

A process for preparing polyurethane compositions containing uretdione groups is described in EP 0 269 943, wherein at least 50% of the diisocyanates used contain uretdione groups.

EP 0 601 793 describes one-component adhesives composed of polyisocyanates containing uretdione groups, of polyisocyanates and of polyols, the ratio of uretdione groups to free alcohols in the end product being not more than 1:1.

EP 0 640 634 describes polyurethane compositions which contain uretdione groups and additionally contain isocyanurate groups as well. Such isocyanurate groups result in lower flexibility.

EP 1 063 251 describes a process for preparing polyurethane compositions containing uretdione groups. It involves mixing diisocyanates with polyisocyanates containing uretdione groups, the diisocyanate component accounting for not more than 70% by weight of the sum of the two components.

The disadvantage of all of the polyurethane compositions containing uretdione groups that are described in these documents is, however, the high reaction temperature for the conversion of the uretdione groups, amounting to 180° C. (30 minutes) or more.

EP 04 103 984.3 describes special powder coating formulations which also contain uretdione-containing polyaddition compounds—as powder coating hardeners—and which because of the catalysts added are also of high reactivity. At the same time, however, a powder coating resin is used as reaction partner. For this application both reaction partners, hardener and resin, must not substantially exceed a molecular weight range of 4000-6000 g/mol, in order to remain sufficiently fluid for a readily flowing powder coating material. Both the 2-component composition and the low molar mass are inappropriate for the problem addressed by the invention.

The problem addressed by this invention was to find polyurethane compositions which contain uretdione groups and which have a high molar mass and are substantially more reactive than comparable, known polyurethane compositions: that is, which react at temperatures of less than 180° C.

Surprisingly it has been found that the problem addressed by the invention is solved by a mixture of the reaction products of polyisocyanates, uretdione-group-containing polyisocyanates and polyols, and special catalysts. With these compositions curing temperatures starting from 70° C. are possible.

The invention provides high-reactivity polyurethane compositions essentially comprising a mixture of I. the reaction product of
A) polyisocyanates having at least two NCO groups and
B) uretdione-group-containing polyisocyanates with
C) oligomeric or polymeric polyols,
D) if desired, low molecular mass substances having at least one OH group,
E) if desired, blocking agents, and
II. the components
a) at least one catalyst of the following formulae:
1. $[XR^1R^2R^3R^4]^+[R^5COO]^-$, X being either N or P, and $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$ to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, urethane, urea or allophanate groups, double bonds, triple bonds or halogen atoms, and $R^5$ is an alkyl, aryl, aralkyl, heteroaryl or alkoxyalkyl radical having 1 to 18 carbon atoms, which is linear or branched and additionally may have one or more alcohol, amino, ester, keto, thio, acid, urethane, urea or allophanate groups, double bonds, triple bonds or halogen atoms,
2. $[XR^1R^2R^3R^4]^+[R^5]^-$, X being either N or P, and $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$ to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, acid, urethane, urea or allophanate groups, double bonds, triple bonds or halogen atoms, and $R^5$ is either OH or F,
3. $M(OR^1)_n(OR^2)_m(OR^3)_o(OR^4)_p(OR^5)_q(OR^6)_r$, where M is a metal in any positive oxidation state according to the sum n+m+o+p+q+r, m, o, p, q and r are integers from 0 to 6 and the sum n+m+o+p+q+r=1 to 6, the radicals $R^1$ to $R^6$ simultaneously or independently of one another are hydrogen or alkyl, aryl, aralkyl, heteroaryl or alkoxyalkyl radicals having 1 to 8 carbon atoms and the radicals may in each case be linear or branched, unbridged or bridged with other radicals, to form monocyclic, bicyclic or tricyclic systems, it being possible for the bridging atoms to include not only carbon but also heteroatoms and, additionally, for said radicals to have one or more alcohol, amino, ester, keto, thio, acid, urethane, urea or allophanate groups, double bonds, triple bonds or halogen atoms, the fraction of these catalysts from groups 1. to 3., individually or in mixtures, being from 0.001 to 3% by weight of the total formulation and, additionally, the catalysts may be surrounded by an inert shell and hence encapsulated; and b) if desired, at least one compound which is reactive toward acid groups and has a weight fraction, based on the total formulation, of from 0.1 to 10%;

c) if desired, at least one acid in monomeric or polymeric form, in a weight fraction, based on the total formulation, of from 0.1 to 10%;

d) if desired, auxiliaries and additives.

Suitability as component I.A) is possessed by all aliphatic, cycloaliphatic, aromatic and (cyclo)aliphatic polyisocyanates having at least two NCO groups.

Particularly suitable polyisocyanates A) include the following: isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), methylene-diphenyl diisocyanate (MDI) and tetramethylxylylene diisocyanate (TMXDI) used with preference. Very particular preference is given to IPDI, HDI and $H_{12}$MDI.

Uretdione-group-containing polyisocyanates B) are well known and are described for example in U.S. Pat. Nos. 4,476,054, 4,912,210, 4,929,724 and EP 417 603. A comprehensive overview of industrially relevant processes for dimerizing isocyanates to uretdiones is offered by J. Prakt. Chem. 336 (1994) 185-200. Conversion of isocyanates to uretdiones generally takes place in the presence of soluble dimerization catalysts, such as dialkylaminopyridines, trialkylphosphines, phosphoramides, triazole derivatives or imidazoles, for example. The reaction, conducted in solvents but preferably in their absence, is terminated by addition of catalyst poisons when a desired conversion has been reached. Excess monomeric isocyanate is separated off afterward by short-path evaporation. If the catalyst is sufficiently volatile the reaction mixture can be freed from the catalyst at the same time as the monomer is separated off. In that case there is no need to add catalyst poisons. A broad range of isocyanates is suitable in principle for the preparation of uretdione-group-containing polyisocyanates. Preferred for use in accordance with the invention are, inter alia, isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), methylenediphenyl diisocyanate (MDI) and tetramethylxylylene diisocyanate (TMXDI). Very particular preference is given to IPDI, HDI and $H_{12}$MDI.

With regard to the hydroxyl-containing oligomers or polymers C) it is preferred to use polyesters, polyethers, polyacrylates, polyurethanes, polyethers and/or polycarbonates having an OH number of from 20 to 500 (in mg KOH/gram) and an average molar mass of from 250 to 6000 g/mol. Particular preference is given to using hydroxyl-containing polyesters having an OH number of from 20 to 150 and an average molecular weight of from 500 to 6000 g/mol. It will be appreciated that mixtures of such polymers can also be used.

Suitable compounds D) include all of the monools, diols or polyols which are customarily employed in PU chemistry and have a molecular weight of at least 32. Dodecanediol in amounts of from 10% to 60% by mass is excluded from the use (disclaimer).

The monoalcohols comprise, for example, methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, and also hydroxymethylcyclohexane.

The diols comprise, for example, ethylene glycol, triethylene glycol, butane-1,4-diol, pentane-1,5-diol, hexane-1,6-diol, 3-methylpentane-1,5-diol, neopentyl glycol, 2,2,4(2,4,4)-trimethylhexanediol, and also neopentyl glycol hydroxypivalate.

The triols comprise, for example, trimethylolpropane, ditrimethylolpropane, trimethylolethane, hexane-1,2,6-triol, butane-1,2,4-triol, tris(β-hydroxyethyl)isocyanurate, pentaerythritol, mannitol or sorbitol.

Suitable blocking agents E) include all of the substances customarily employed in PU chemistry, such as ethyl acetoacetate, diisopropylamine, methyl ethyl ketoxime, diethyl malonate, ε-caprolactam, 1,2,4-triazole, and 3,5-dimethylpyrazole.

The conversion of the polyisocyanates B) bearing uretdione groups and the polyisocyanates A) to polyurethane compounds I containing uretdione groups involves the reaction of the free NCO groups with hydroxyl-containing monomers of low molecular mass, oligomers and/or polymers C) and D), and if desired, blocking agents E), and has already been frequently described (EP 0 669 353, EP 0 669 354, DE 30 30 572, EP 0 639 598 or EP 0 803 524). The reaction of IA), IB), IC), ID) and IE) can take place in suitable equipment, stirred tanks or static mixers, in solution or in bulk. The reaction temperature in this context is from 40 to 220° C., preferably from 40 to 120° C. Suitable solvents include, as is known, all liquid substances which are not reactive toward isocyanate groups, such as, for example, acetone, ethyl acetate, butyl acetate, Solvesso, N-methylpyrrolidine, dimethylformamide, methylene chloride, tetrahydrofuran, dioxane, methoxypropyl acetate, and toluene.

The catalysts IIa) that are essential to the invention satisfy 1. the formula $[XR^1R^2R^3R^4]^+ [R^5COO]^-$, X being either N or P, and $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$ to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, urethane, urea or allophanate groups, double bonds, triple bonds or halogen atoms, and $R^5$ is an alkyl, aryl, aralkyl, heteroaryl or alkoxyalkyl radical having 1 to 18 carbon atoms, which is linear or branched and additionally may have one or more alcohol, amino, ester, keto, thio, acid, urethane, urea or allophanate groups, double bonds, triple bonds or halogen atoms, or 2. the formula $[XR^1R^2R^3R^4]^+ [R^5]^-$, X being either N or P, and $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$ to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, acid, urethane, urea or allophanate groups, double bonds, triple bonds or halogen atoms, and $R^5$ is either OH or F, or 3. the formula $M(OR^1)_n(OR^2)_m(OR^3)_o(OR^4)_p(OR^5)_q(OR^6)_r$, where M is a metal in any positive oxidation state according to the sum n+m+o+p+q+r, m, o, p, q and r are integers from 0 to 6 and the sum n+m+o+p+q+r=1 to 6, the radicals $R^1$ to $R^6$ simultaneously or independently of one another are hydrogen or alkyl, aryl, aralkyl, heteroaryl or alkoxyalkyl radicals having 1 to 8 carbon atoms and the radicals may in each case be linear or branched, unbridged or bridged with other radicals, to form monocyclic, bicyclic or tricyclic systems, it being possible for the bridging atoms to include not only carbon but also heteroatoms and, additionally, for said radicals to have one or more alcohol, amino, ester, keto, thio, acid, urethane, urea or allophanate groups, double bonds, triple bonds or halogen atoms.

Examples of such catalysts under 1. are tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate and tetrabutylphosphonium acetate, tetrabutylphosphonium formate and ethyltriphenylphosphonium acetate, tetrabutylphosphonium benzotriazolate, tetraphenylphosphonium phenoxide and trihexyltetradecylphosphonium decanoate.

Examples of such catalysts under 2. are methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecyl-ammonium hydroxide, benzyltrimethylammonium hydroxide, benzyltriethyl-ammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride and benzyltrimethylammonium fluoride, and tetrabutylphosphonium hydroxide, and tetrabutylphosphonium fluoride.

Examples of such catalysts under 3. are lithium hydroxide, sodium hydroxide, potassium hydroxide, rubidium hydroxide, cesium hydroxide, beryllium hydroxide, magnesium hydroxide, calcium hydroxide, strontium hydroxide, barium hydroxide, aluminum hydroxide, zinc hydroxide, lithium methoxide, sodium methoxide, potassium methoxide, magnesium methoxide, calcium methoxide, barium methoxide, lithium ethoxide, sodium ethoxide, potassium ethoxide, magnesium ethoxide, calcium ethoxide, barium ethoxide, lithium propoxide, sodium propoxide, potassium propoxide, magnesium propoxide, calcium propoxide, barium propoxide, lithium isopropoxide, sodium isopropoxide, potassium isopropoxide, magnesium isopropoxide, calcium isopropoxide, barium isopropoxide, lithium 1-butoxide, sodium 1-butoxide, potassium 1-butoxide, magnesium 1-butoxide, calcium 1-butoxide, barium 1-butoxide, lithium 2-butoxide, sodium 2-butoxide, potassium 2-butoxide, magnesium 2-butoxide, calcium 2-butoxide, barium 2-butoxide, lithium isobutoxide, sodium isobutoxide, potassium isobutoxide, magnesium isobutoxide, calcium isobutoxide, barium isobutoxide, lithium tert-butoxide, sodium tert-butoxide, potassium tert-butoxide, magnesium tert-butoxide, calcium tert-butoxide, barium tert-butoxide, lithium phenoxide, sodium phenoxide, potassium phenoxide, magnesium phenoxide, calcium phenoxide and barium phenoxide.

It will be appreciated that mixtures of such catalysts can also be used. The catalysts are present in an amount of from 0.001 to 3% by weight, based on the total formulation, in the polyurethane composition. The catalysts may include water of crystallization, in which case such water is not taken into account when calculating the amount of catalyst used; that is, the amount of water is removed from the calculation. Particular preference is given to using tetraethylammonium benzoate and tetrabutylammonium hydroxide.

One version of the invention includes the polymeric attachment of such catalysts IIa) to component I or to the starting materials A) to C). For example, free alcohol, thio or amino groups of the ammonium or phosphonium salts can be reacted with isocyanate groups of component A) or B) or with alcohol groups of the hydroxyl-containing polymers C), in order to integrate the catalysts IIa) into the polymeric system.

It should be borne in mind in this context that the activity of the catalysts under IIa) decreases significantly in the presence of acids. Because of the way in which polyesters are prepared, they occasionally still include acid groups to a small extent. In the presence of polyesters which carry such acid groups, for example, it is appropriate either to use the aforementioned catalysts in excess, relative to the acid groups, or else to add reactive compounds which are capable of scavenging acid groups (IIb). Both monofunctional and polyfunctional compounds can be used for this purpose.

Reactive acid-scavenging compounds IIb) are common knowledge in paint chemistry. For example, epoxy compounds, carbodiimides, hydroxyalkylamides or 2-oxazolines, but also inorganic salts, such as hydroxides, hydrogencarbonates or carbonates, react with acid groups at elevated temperatures. Suitable examples include triglycidyl ether isocyanurate (TGIC), EPIKOTE® 828 (diglycidyl ether based on bisphenol A, Shell), Versatic acid glycidyl esters, ethylhexyl glycidyl ether, butyl glycidyl ether, Polypox R 16 (pentaerythritol tetraglycidyl ether, UPPC AG) and also other Polypox grades containing free epoxy groups, Vestagon EP HA 320, (hydroxyalkylamide, Degussa AG), and also phenylenebisoxazoline, 2-methyl-2-oxazoline, 2-hydroxyethyl-2-oxazoline, 2-hydroxypropyl-2-oxazoline, 5-hydroxypentyl-2-oxazoline, calcium hydroxide, barium hydroxide, sodium carbonate and calcium carbonate. It will be appreciated that mixtures of such substances are also suitable. These reactive compounds can be used in weight fractions of from 0.1% to 10%, preferably from 0.5% to 3%, based on the total formulation.

Acids specified under IIc) are all substances, solid or liquid, organic or inorganic, monomeric or polymeric, which possess the properties of a Brønsted acid or of a Lewis acid. Examples that may be mentioned include the following: sulfuric acid, acetic acid, benzoic acid, malonic acid, terephthalic acid, and also copolyesters or copolyamides having an acid number of at least 20.

Additives IId) such as leveling agents, e.g., polysilicones or acrylates, light stabilizers, e.g., sterically hindered amines, or other auxiliaries, as described for example in EP 0 669 353, can be added in a total amount of from 0.05% to 5% by weight. Fillers and pigments, such as titanium dioxide, for example, can be added in an amount of up to 50% by weight of the total composition. Optionally it is possible for catalysts such as are already known in polyurethane chemistry to be present. These are primarily organometallic catalysts, such as dibutyltin dilaurate, for example, or else tertiary amines, such as 1,4-diazabicyclo[2.2.2]octane, for example, in amounts of from 0.001% to 1% by weight.

The invention also provides a process for preparing hydroxyl-terminated polyurethane compounds containing uretdione groups, the preparation of the polyurethane compositions taking place in solution or in bulk by reaction of I. and II at from 40 to 220° C., preferably from 40 to 120° C.

I and II can be mixed in suitable equipment, such as in stirred tanks, or solution or in bulk. The mixing temperature here is from 40 to 220° C., preferably from 40 to 120° C. Suitable solvents include, as is known, all liquid substances which are not reactive toward isocyanate groups, such as acetone, ethyl acetate, butyl acetate, Solvesso, N-methylpyrrolidine, dimethylformamide, methylene chloride, tetrahydrofuran, dioxane, methoxypropyl acetate and toluene, for example.

Components IIa), IIb), IIc) and/or IId) may also be added to the reaction apparatus before, during or after the preparation of I.

The invention additionally provides for the use of the uretdione-containing polyurethane compounds of the invention, in pure form or in blends with further polymers, for preparing thermoplastic urethanes (TPU) and molding compounds.

The invention also provides thermoplastic polyurethane molding compounds which comprise polyurethane compositions essentially comprising a mixture of I. the reaction product of
A) polyisocyanates having at least two NCO groups and
B) uretdione-group-containing polyisocyanates with
C) oligomeric or polymeric polyols,
D) if desired, low molecular mass substances having at least one OH group,
E) if desired, blocking agents, and II. the components a) at least one catalyst of the following formulae:
1. $[XR^1R^2R^3R^4]^+[R^5COO]^-$, X being either N or P, and $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$ to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, urethane, urea or allophanate groups, double bonds, triple bonds or halogen atoms, and $R^5$ is an alkyl, aryl, aralkyl, heteroaryl or alkoxyalkyl radical having 1 to 18 carbon atoms, which is linear or branched and additionally may have one or more alcohol, amino, ester, keto, thio, acid, urethane, urea or allophanate groups, double bonds, triple bonds or halogen atoms,
2. $[XR^1R^2R^3R^4]^+[R^5]^-$, X being either N or P, and $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$ to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, acid, urethane, urea or allophanate groups, double bonds, triple bonds or halogen atoms, and $R^5$ is either OH or F,
3. $M(OR^1)_n(OR^2)_m(OR^3)_o(OR^4)_p(OR^5)_q(OR^6)_r$, where M is a metal in any positive oxidation state according to the sum n+m+o+p+q+r, m, o, p, q and r are integers from 0 to 6 and the sum n+m+o+p+q+r=1 to 6, the radicals $R^1$ to $R^6$ simultaneously or independently of one another are hydrogen or alkyl, aryl, aralkyl, heteroaryl or alkoxyalkyl radicals having 1 to 8 carbon atoms and the radicals may in each case be linear or branched, unbridged or bridged with other radicals, to form monocyclic, bicyclic or tricyclic systems, it being possible for the bridging atoms to include not only carbon but also heteroatoms and, additionally, for said radicals to have one or more alcohol, amino, ester, keto, thio, acid, urethane, urea or allophanate groups, double bonds, triple bonds or halogen atoms, the fraction of these catalysts from groups 1. to 3., individually or in mixtures, being from 0.001 to 3% by weight of the total formulation and, additionally, the catalysts may be surrounded by an inert shell and hence encapsulated; and b) if desired, at least one compound which is reactive toward acid groups and has a weight fraction, based on the total formulation, of from 0.1 to 10%;
c) if desired, at least one acid in monomeric or polymeric form, in a weight fraction, based on the total formulation, of from 0.1 to 10%;
d) if desired, auxiliaries and additives.

The uretdione-containing polyurethane compounds of the invention can be mixed with polymers, alternatively with polycarbonates, acrylonitrile copolymers, acrylonitrile-butadiene-styrene polymers, acrylonitrile-styrene-acrylic rubber molding compounds, copolymers of ethylene and/or propylene and also acrylic acid or methacrylic acid or sodium salts or Zn salts thereof, and also copolymers of ethylene and/or propylene and also acrylic esters or methacrylic esters, auxiliaries and additives such as UV stabilizers and antioxidants, for example, or can be used in pure form, if desired with auxiliaries and additives, as TPU.

The thermoplastic molding compounds of the invention can be prepared by mixing the TPU granules, prepared by methods known in principle, with the respective adjuvants and compounding the mixture in a manner known to the skilled worker, by reextrusion. Subsequently the resulting molding compound can be granulated and converted by (cold) grinding into a sinterable powder suitable, for example, for processing by the powder slush process (see, for example, DE 39 32 923 or else U.S. Pat. No. 6,057,391). Such powders preferably have particle sizes of from 50 to 500 µm. The molding compounds of the invention are suitable for producing a very wide variety of moldings, examples including films and/or sintered sheets.

The films and/or sintered sheets produced from the polyurethane molding compounds of the invention are suitable for example for use as surface coverings in means of transport (e.g. aircraft, autos, ships and railways).

The subject matter of the invention is illustrated below by reference to examples.

EXAMPLE

| Ingredients | Product description, manufacturer |
|---|---|
| IPDI | isophorone diisocyanate, NCO content 37.6%; DEGUSSA AG |

-continued

| Ingredients | Product description, manufacturer |
|---|---|
| IPDI uretdione | from IPDI by dimerization, free NCO content: 17.5%, latent NCO content: 19.7%; DEGUSSA AG |
| DYNACOLL 7380 | (partially) crystalline OH polyester, OH number 32 mg KOH/g, m.p.: 70° C., DEGUSSA AG, Coatings & Colorants |
| DBTL | dibutyltin dilaurate, ALDRICH |
| TBAB | Tetrabutylammonium benzoate |
| POLYPOX R 16 | Polyepoxide, UPPC |

Set out below are examples which illustrate the essence of the invention but are not intended to restrict it.

EXAMPLES a) Example 1

Inventive 224 g of Dynacoll 7380, 18.5 g of IPDI uretdione and 2.9 g of IPDI were dissolved in succession in 1.5 l of methylene chloride and the solution was admixed with 0.2 g of DBTL. It was then boiled under reflux for 8 h, so that the free NCO content drops below 0.1%. Thereafter it was cooled to room temperature and 0.37 g of TBAB and 1.86 g of Polypox R 16 were added. The solvent was removed completely, first on a rotary evaporator and finally in a vacuum drying oven at 20 to 30° C. The product was characterized by means of the test methods below.

b) Example 2

Comparative, not Inventive

Example 1 was repeated without the addition of TBAB. The product was characterized by means of the test methods below.

|  | Example 1 inventive | Example 2 comparative, not inventive |
|---|---|---|
| UD/IPDI ratio | 75:25 | 75:25 |
| Molar OH:NCO ratio | 10:9 | 10:9 |
| Viscosity number (DIN53728): | | |
| Initial | 38 | 33 |
| after 30 min. at 70° C. | 47 | 34 |
| after 30 min. at 90° C. | 88 | 47 |
| after 30 min. at 120° C. | 112 | 42 |
| Shore hardness (DIN 53505) | 55 D | 44 D |
| Softening point (° C.) (DIN ISO 4625): | | |
| Initial | 80 | 76 |
| 8 h at 50° C. | 93 | 80 |
| 8 h at 100° C. | >200 | 81 |

Evidently the product from Example 1 is much more reactive than the product from the comparative example, Example 2.

What is claimed is:
1. A polyurethane composition, comprising a mixture of:
 (a) a reaction product of (a1) a polyisocyanate comprising at least two NCO groups and (a2) a uretdione-group-containing polyisocyanate with (a3) an oligomeric or (a4) polymeric polyol, optionally (a5) a low molecular mass substance having at least one OH group, and optionally (a6) a blocking agent, wherein the polyisocyanate comprises isophorone diisocyanate and the uretdione-group-containing polyisocyanate comprises dimerized isophorone diisocyanate;
 (b) a catalyst;
 (c) an epoxide that is reactive toward an acid group;
 (d) optionally, an acid in monomeric (d1) or polymeric form (d2); and
 (e) optionally, at least one of an auxiliary (e1) and an additive (e2),
 wherein
 the catalyst (b) comprises a $C_1$-$C_4$ tetraalkyl ammonium benzoate;
 wherein the catalyst (b1) is present in an amount of from 0.001 to 3% by weight, based on a total weight of the composition,
 wherein the epoxide is present in an amount of from 0.1 to 10% by weight, based on the total weight of the composition,
 wherein the acid (d) in monomeric (d1) or polymeric (d2) form is optionally present in an amount of from 0.1 to 10% by weight, based on the total weight of the composition, and
 wherein the composition forms a thermoplastic polymeric material when reacted either alone or with other polymers.

2. The composition of claim 1, comprising (e) the at least one of an auxiliary and an additive.

3. The composition of claim 1,
 wherein the oligomeric (a3) or polymeric (a4) polyol has an OH number of from 20 to 500 (in mg KOH/gram).

4. The composition of claim 3, wherein the oligomeric (a3) or polymeric (a4) polyol comprises at least one hydroxyl-comprising polyester having an OH number of from 20 to 150 mg KOH/gram and an average molecular weight of from 500 to 6000 g/mol.

5. The composition of claim 1, wherein the low molecular mass substance (a5) is employed to form the reaction product, and
 wherein the low molecular mass substance (a5) comprises at least one selected from the group consisting of a monool, a diol, and a triol.

6. The composition of claim 1, wherein the blocking agent (a6) is employed to form the reaction product, and
 wherein the blocking agent (a6) comprises at least one selected from the group consisting of ethyl acetoacetate, diisopropylamine, methyl ethyl ketoxime, diethyl malonate, ε-caprolactam, 1,2,4-triazole, and 3,5-dimethylpyrazole.

7. The composition of claim 1, wherein the acid (d) is present in the composition, and
 wherein the acid (d) comprises at least one selected from the group consisting of sulfuric acid, acetic acid, benzoic acid, malonic acid, terephthalic acid, a copolyester having an acid number of at least 20, and a copolyamide having an acid number of at least 20.

8. The composition of claim 1, wherein the at least one of an auxiliary (e1) and an additive (e2) is present in the composition, and comprise at least one selected from the group consisting of a leveling agent, a light stabilizer, a filler, and a pigment.

9. The composition of claim 1, further comprising at least one additional catalyst selected from the group consisting of an organometallic catalyst and a tertiary amine.

10. A process for preparing a hydroxyl-terminated polyurethane compound comprising a uretdione group, the process comprising:

preparing the polyurethane composition of claim 1 in solution or in bulk by reacting the reaction product (a), the catalyst (b), optionally the compound reactive toward an acid group (c), optionally the one acid (d1) or (d2), and optionally the at least one of an auxiliary (e1) and an additive (e2), at a temperature of from 40 to 220° C.

11. The composition of claim 1, further comprising at least one polymer selected from the group consisting of
(i) a polycarbonate,
(ii) an acrylonitrile copolymer,
(iii) an acrylonitrile-butadiene-styrene polymer
(iv) an acrylonitrile-styrene-acrylic rubber molding compound,
(v) a copolymer of at least two of ethylene, propylene, acrylic acid, a sodium salt of acrylic acid, a zinc salt of acrylic acid, methacrylic acid, a sodium salt of methacrylic acid, and a zinc salt of methacrylic acid, and
(vi) a copolymer of at least two of ethylene, propylene, an acrylic ester, and a methacrylic ester.

12. The composition of claim 1, further comprising a polycarbonate.

13. The polyurethane composition of claim 1, wherein the catalyst (b) is encapsulated by an inert shell.

14. The polyurethane composition of claim 1, wherein the catalyst (b) is tetrabutylammonium benzoate.

15. The polyurethane composition of claim 1, wherein the epoxide (c) is a polyepoxide.

16. The polyurethane composition of claim 1, wherein the catalyst (b) is at least one selected from the group consisting of tetramethylammonium benzoate, tetraethylammonium benzoate, tetrapropylammonium benzoate, and tetrabutylammonium benzoate.

17. The polyurethane composition of claim 11, wherein at least components (a), (b) and (c) are present as a mixture with the polymer.

18. The polyurethane composition of claim 1, wherein the polyisocyanate (a1) is isophorone diisocyanate.

* * * * *